United States Patent Office 3,141,022
Patented July 14, 1964

3,141,022
PREPARATION OF 2-AMINO-5-ARYL-1,3,4-OXADIAZOLES
Joseph J. Piala, Metuchen, and Harry Louis Yale, New Brunswick, N.J., assignors to Olin Mathieson Chemical Corporation, New York, N.Y., a corporation of Virginia
No Drawing. Original application Dec. 12, 1955, Ser. No. 552,246. Divided and this application July 25, 1961, Ser. No. 126,493
2 Claims. (Cl. 260—307)

This application is a division of application Serial No. 552,246, filed December 12, 1955, and now abandoned.

This invention relates to compositions useful pharmacologically as muscle-relaxants and/or tranquilizing agents; and to new and improved processes for the preparation of the medicaments therein. More particularly this invention relates to pharmaceutical compositions comprising a significant amount of a pharmaceutical carrier and a medicament selected from the class consisting of oxadiazoles of the general formula

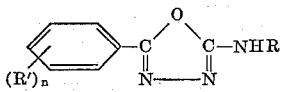

wherein R is hydrogen or acyl, R′ is hydrogen, lower alkyl, halogen, or lower alkoxy, and $n$ is a positive integer from one through five; and acid-addition salts thereof.

The compositions of this invention are effective both as skeletal muscle-relaxants and tranquilizing agents. Thus, for use as muscle-relaxants in the alleviation of tremors, especially those of Parkinsonism and acute alcoholism, or to obtain muscular relaxation in surgical anesthesia, the medicaments of this invention are administered perorally in a daily dosage of less than about four grams (preferably from about 0.5 gram to about 2 grams), optimally in doses of about 0.25 gram to about 0.5 gram.

Exemplary compounds within the scope of this invention include: 5-phenyl-2-amino-1,3,4-oxadiazole; 5-halophenyl-2-amino-1,3,4-oxadiazole (e.g. 5-m-chlorphenyl-2-amino-1,3,4-oxadiazole); 5-(lower alkyl) phenyl-2-amino-1,3,4-oxadiazole (e.g. 5-m-tolyl-2-amino-1,3,4-oxadiazole and 5-o,p-xylyl-2-amino-1,3,4-oxadiazole); and 5-(lower alkoxy) phenyl - 2 - amino-1,3,4-oxadiazole (e.g. 5 - m - methoxyphenyl - 2 - amino - 1,3,4 - oxadiazole, 5 - o - methoxyphenyl - 2 - amino - 1,3,4 - oxadiazole, 5-p-methoxyphenyl-2-amino-1,3,4-oxadiazole, and 5-(3′,4′,5′ - trimethoxyphenyl) - 2 - amino - 1,3,4 - oxadiazole; acid-additional salts of the above (particularly the non-toxic acid-addition salts, such as those with strong mineral acids exemplified by hydrochloric acid, sulfuric acid and nitric acid); and the 2-N-acyl derivatives thereof particularly carboxylic acid amides, such as the alkanoic acid amides as exemplified by: 5-phenyl-2-acetamide-1,3,4-oxadiazole; 5 - m - chlorphenyl - 2 - isovaleramide - 1,3,4-oxadiazole; and 5-phenyl-2-laurylamido-1,3,4-oxadiazole.

The medicaments of this invention are preferably prepared by a process which comprises heating a 1-substituted thiosemicarbazide with lead oxide at a temperature in the range of about 85° C. to about 200° C. preferably in an organic solvent for the thiosemicarbazide reactant, and recovering the resultant 5-substituted 2-amino-1,3,4-oxadiazole. Preferably the 1-substituted thiosemicarbazide is a compound of the formula

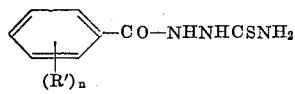

wherein R′ and $n$ are as hereinbefore defined, although the process is of general applicability and can be used to prepare other oxadiazole derivatives wherein the 5-substituent (and hence the aryl portion of the aroyl radical which is the 1-substituent on the thiosemicarbazide reactant) is other than phenyl or a substituted phenyl as for example alkyl, aralkyl, and heterocyclic.

We have further found that by operating at said range of temperature (optimally at a range of about 100° C. to about 175° C.), not only is the time of reaction substantially decreased but further the yield of desired oxadiazole is greatly increased. This increase in yield could not have been predicted a priori, but may be due to the diminution of undesired side-products, such as 5-substituted-2-mercapto-1,3,4-triazole which is formed concommitantly by competing side-reactions. To attain this preferred relatively high temperature range, the reaction is optimally conducted in an organic solvent which under the conditions of the reaction refluxes in said range. Among the solvents which may be so utilized are alkanols of more than two carbon atoms (e.g. amyl alcohol), lower alkanoylamides (e.g. dimethyl formamide and acetamide) and lower alkyl lower alkanoates (e.g. amyl acetate). The free base, thus formed, can then, if desired, be converted to a 2-amido derivative by heating with an acylating agent, preferably either an acyl halide or acid anhydride (e.g. an alkanoic acid anhydride such as acetic anhydride or an alkanoyl chloride such as lauryl chloride). The lower alkanoic amides can also be prepared directly from the starting thiosemicarbazide by heating the desired thiocarbazide with the desired lower alkanoic acid anhydride (e.g. acetic anhydride) and recovering the 2-lower alkanoylamido-5-aryl-1,3,4-oxadiazole formed. It should be noted that although the yield of amide obtainable by this alternate procedure is less than that which can be prepared by the preferred two-step process, no lead oxide is needed in this alternative method. The free bases can also be converted, if desired, to their acid-additional salts, preferably the non-toxic acid addition salts, by heating the base in a dilute aqueous solution of the desired acid and cooling the solution thus formed to precipitate the salt.

The following examples illustrate the methods of this invention:

EXAMPLE 1

*2-Amino-5-Phenyl-1,3,4-Oxadiazole*

A mixture of 20 g. of 1-benzoyl-3-thiosemicarbazide, 17 g. of Pb₃O₄ and 800 ml. of dimethyl formamide is stirred and refluxed for 1.25 hours and then filtered hot. The filtrate is concentrated in vacuo to give about 12.5 g. of 2-amino-5-phenyl-1,3,4-oxadiazole, M.P. about 243–245° C. with decomposition.

EXAMPLE 2

A mixture of 120 g. of 1-benzoyl-3-thiosemicarbazide, 4800 ml. of amyl alcohol and 102 g. of Pb₃O₄ is stirred and refluxed for 2 hours and filtered hot. The filtrate on cooling yields about 75 g. of 2-amino-5-phenyl-1,3,4-oxadiazole, M.P. about 243–245° C. with decomposition.

EXAMPLE 3

*2-Amino-5-(m-Chlorophenyl)-1,3,4-Oxadiazole*

(a) *m-chlorobenzoic acid hydrazide.*—A mixture of 51 g. of methyl m-chlorobenzoate, 20 g. of 100% hydrazine hydrate and 250 ml. of dry methanol is refluxed 6 hours and cooled to give about 42 g. of m-chlorobenzoic acid hydrazide, M.P. approximately 155–156° C.

(b) *1-(m-chlorobenzoyl)-3-thiosemicarbazide.* — A solution of 42 g. m-chlorobenzoic acid hydrazide, 19 g. of ammonium thiocyanate and 250 ml. of N hydrochloric acid is refluxed 0.5 hour and cooled to give about 21 g. of 1-(m-chlorobenzoyl)-3-thiosemicarbazide, M.P. about 196–197° C.

(c) *2-amino-5-(m-chlorophenyl)-1,3,4-oxadiazole.*—A mixture of 20 g. of 1-(m-chlorobenzoyl)-3-thiosemicarbazide, 800 ml. of 95% ethanol and 100 g. of $Pb_3O_4$ is stirred and refluxed for 48 hours and filtered hot. The cooled filtrate yields about 6 g. of 2-amino-5-(m-chlorophenyl)-1,3,4-oxadiazole, M.P. about 245–246° C.

EXAMPLE 4

*2-Amino-5-(m-Methoxyphenyl)-1,3,4-Oxadiazole*

By substituting 50 g. of methyl m-methoxybenzoate for the m-chlorobenzoate in the procedure of Example 3, 2 - amino - 5 - (m - methoxyphenyl) - 1,3,4 - oxadiazole, M.P. about 190–191° C., is obtained in approximately 3 g. yield.

EXAMPLE 5

*2-Amino-5-(3,4,5-Trimethoxyphenyl)-1,3,4-Oxadiazole*

By substituting 63 g. of methyl 3,4,5-trimethoxybenzoate for the m-chlorobenzoate in the procedure of Example 3, 2-amino-5-(3,4,5-trimethoxyphenyl)-1,3,4-oxadiazole, M.P. about 214–215° C., is obtained in approximately 27 g. yield.

In a similar manner, by substituting other substituted benzoic acid esters for the m-chlorobenzoate of Example 3, the corresponding 2-amino-5-substituted phenyl-1,3,4-oxadiazole derivatives are formed.

EXAMPLE 6

*2-Acetamido-5-Phenyl-1,3,4-Oxadiazole*

A mixture of 25 g. of 1-benzoyl-3-thiosemicarbazide and 75 ml. of acetic anhydride is refluxed for 1 hour and the mixture allowed to cool. The solid which crystallizes is filtered to give about 10 g. of 2-acetamido-5-phenyl-1,3,4-oxadiazole, M.P. approximately 225–227° C.

EXAMPLE 7

10 g. of 2-amino-5-phenyl-1,3,4-oxadiazole and 25 ml. of acetic anhydride are refluxed 1 hour and the mixture allowed to cool. The solid which crystallizes is filtered to give about 9 g. of 2-acetamido-5-phenyl-1,3,4-oxadiazole, M.P. approximately 225–227° C., identical with the product of Example 6.

In a similar manner other 2-acylated derivatives can be obtained. Thus, by substituting propionic anhydride for the acetic anhydride in the procedure of either Example 6 or 7, the 2-propionyl derivative is obtained.

EXAMPLE 8

*2-Amino-5-Phenyl-1,3,4-Oxadiazole-Hydrochloride*

Ten grams of 2-amino-5-phenyl-1,3,4-oxadiazole are dissolved in the minimum amount of boiling dilute (10%) hydrochloric acid. The hot solution is filtered and the filtrate allowed to cool to give about 10 g. of 2-amino-5-phenyl-1,3,4-oxadiazole, hydrochloride, M.P. about 185–187° C. with decomposition.

EXAMPLE 9

*2-Amino-5-Phenyl-1,3,4-Oxadiazole, Nitric Acid Salt*

2-amino-5-phenyl-1,3,4-oxadiazole is dissolved in the minimum amount of boiling dilute nitric acid. On cooling, the solution gives the crystalline salt, 2-amino-5-phenyl-1,3,4-oxadiazole, nitric acid salt, M.P. about 166–167° C. with decomposition.

EXAMPLE 10

*2-Amino-5-Phenyl-1,3,4-Oxadiazole, Sulfuric Acid Salt*

By substituting dilute sulfuric acid for the dilute hydrochloric acid in the procedure of Example 8, 2-amino-5-phenyl-1,3,4-oxadiazole, sulfuric acid salt, M.P. about 185–187° C., is obtained.

Similarly, if other 2-amino-1,3,4-oxadiazoles [e.g. 2-amino-5-(m-chlorophenyl)-1,3,5-oxadiazole] are submitted for the 2-amino-5-phenyl-1,3,4-oxadiazole in the procedure of Examples 8, 9 and 10, the respective hydrochloric, nitric, and sulfuric acid salts are prepared.

The invention may be variously otherwise embodied within the scope of the appended claims.

What is claimed is:

1. The method of preparing compounds of the formula

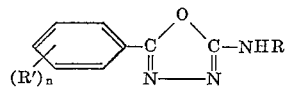

wherein R is alkanoyl; *n* is a positive integer less than 6; and R' is selected from the group consisting of hydrogen, lower alkyl, halogen and lower alkoxy; which comprises heating a compound of the formula

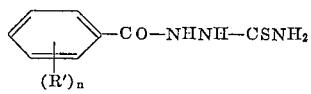

wherein R' and *n* are as hereinbefore defined; with a lower alkanoic acid anhydride.

2. The method of claim 1 wherein the anhydride is acetic anhydride and the heating is done at reflux.

References Cited in the file of this patent

UNITED STATES PATENTS 2,832,787     Bernstein et al. _____ Apr. 29, 1958

OTHER REFERENCES

Brooks et al.: Chem. Abstracts, vol. 44, col. 7798 (1950).

Freund et al.: Ber. Deut. Chem., vol. 29, pp. 2511–17 (1896).

Morton: the Chemistry of Heterocyclic Compounds (New York, 1946), pages 364–5 and 374–5.

Hoggarth: J. Chem. Soc. (London) (1949), pages 1163–7.

Brooks et al.: J. Chem. Soc. (London) (1950), pages 452–9.

Brooks et al.: J. Chem. Soc., 1950, pp. 452–9.